April 24, 1956   W. J. S. JOHNSON   2,742,941
RUBBER TIRE
Filed March 10, 1952

INITIAL COMPRESSION

BUCKLING

FINAL COMPRESSION

WALLACE J. S. JOHNSON,
INVENTOR.

BY
Mellin and Hanscom
ATTORNEYS

United States Patent Office 2,742,941
Patented Apr. 24, 1956

2,742,941
RUBBER TIRE

Wallace J. S. Johnson, Berkeley, Calif., assignor, by mesne assignments, to Up-Right, Inc., Berkeley, Calif., a corporation of California Application March 10, 1952, Serial No. 275,784

2 Claims. (Cl. 152—326)

This invention relates to a tire construction.

There have been various previous attempts to design a rubber tire to structurally support instead of pneumatically support a load imposed thereon. These prior attempts have not proven satisfactory for various reasons, one of which is that insufficient energy has been absorbed by these prior tire constructions and thus annoying shocks have been transmitted to the occupants in the vehicles and the springs of the vehicles have been subjected to excessive service.

It is a main object of the present invention to provide an improved rubber tire designed to structurally support a load and have high energy absorbing characteristics heretofore not achieved.

Various other objects of the present invention will be apparent from the following description taken in connection with the accompanying drawings in which.

Figure 1:
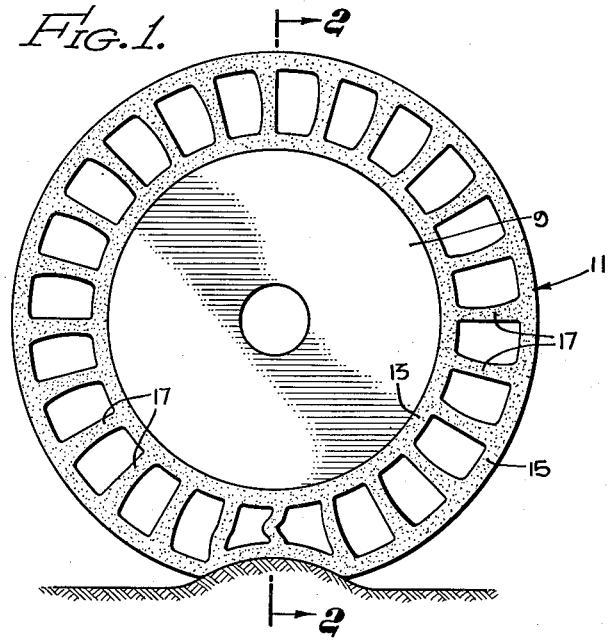
Fig. 1 is a side elevational view of a wheel having mounted thereon the tire of the present invention.
Figure 2:
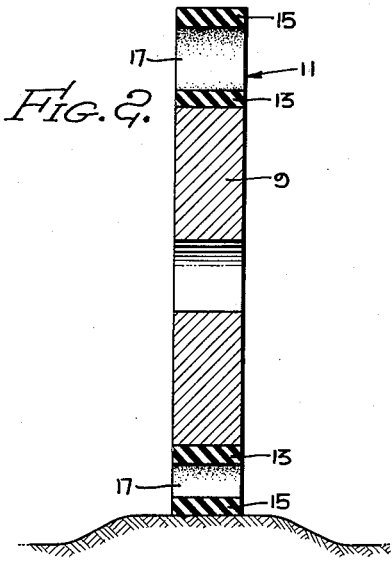
Fig. 2 is a sectional view taken along line 2—2 of Fig. 1.

Referring to the accompanying drawings wherein similar reference characters designate similar parts throughout, there is disclosed a wheel having a hub 9 on which a tire 11 embodying the concepts of the present invention is mounted. The tire includes an inner elastomer rim 13 and an outer elastomer rim 15 disposed in spaced relation with respect to the inner rim. Connecting the rims are a plurality of radially arranged equally spaced elastomer columns 17. Each column has one straight side and one concave side, and is three to five times as long as its minimum width. The concave sides all face in the same circumferential direction. Tire 11 may be constructed of rubber, synthetic or natural, or other similar elastomer material.

The above described concave side design for the columns is important since it predetermines the direction of buckling of the columns, whereby a construction is attained wherein like portions of the tire have like load sustaining characteristics under buckling and also after buckling. It will be appreciated that if each column merely had two straight sides, the column would buckle in one direction one time and in the opposite direction another time. This would set up a condition where like portions of the tire would have different load sustaining characteristics which is obviously undesirable.

Figure 3:
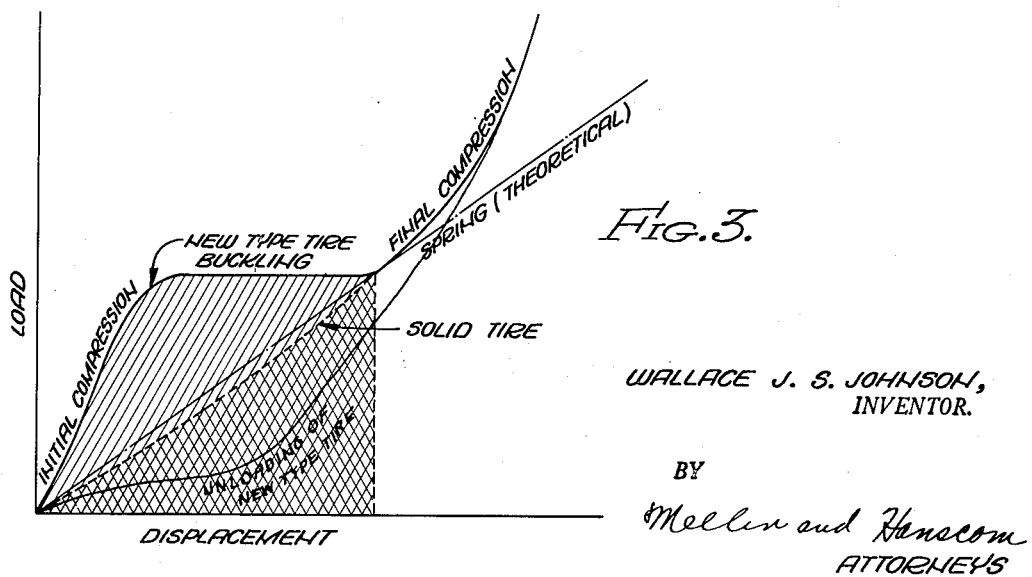
Fig. 3 is a graph illustrating the energy absorbing characteristics of the tire of the present invention as compared with a solid tire and a spring.

Since columns 17 are arranged radially of the tire and have the length to width ratio set forth above, they will exhibit true columnar action under initial stress as shown in the graph in Fig. 3, the columns sustaining the load without buckling at this stage of operation and at this degree of load imposition. At a predetermined load, each column will buckle and will collapse at a generally constant load value until the complete collapse point is reached, at which time solid rubber compression will follow. As is apparent from Fig. 3, it is this buckling characteristic of columns 17, after the initial load has been sustained by the columns, characteristic of relatively long slender columns, that materially increases the amount of energy absorbed over a solid tire construction, shown in broken lines in Fig. 3, and over a spring construction shown in dotted lines in Fig. 3.

Figure 4:
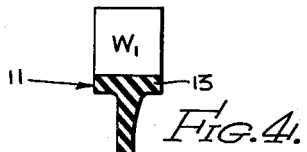
Fig. 4 is a cross-sectional view illustrating diagrammatically the condition of an elastomer column under initial load and compression.
Figure 5:
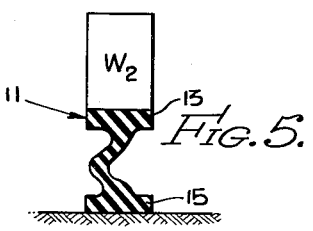
Fig. 5 is a view similar to Fig. 4 but showing the elastomer column as having been buckled by a load in excess of that imposed in Fig. 1.
Figure 6:
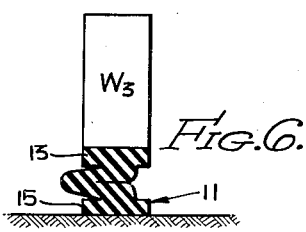
Fig. 6 is a view similar to Fig. 4 but showing a still subsequent stage of operation wherein the load is greater than that which is sufficient to cause buckling of the member and showing the member under final compression.

Figs. 4, 5 and 6 depict several stages during the operation of a relatively long slender column in a tire of the present invention. Fig. 4 shows the column under initial compression in which the load is sustained by an axial compression of the column. Fig. 5 shows the condition of the member during buckling thereof when the load exceeds the buckling point of the column. Fig. 6 shows the completely collapsed column taking load under compression.

By the present invention, a tire has been provided wherein the advantages attained include the smooth rolling characteristics of a solid tire because of the initial columnar load sustaining capabilities of columns 17, and unique shock-absorbing ability because of the buckling of the columns under sudden and excessive shocks. Because of the large energy absorption characteristics of the tire of the present invention, a major portion of the energy of the larger shocks is absorbed by the tire so that excessive shocks are not transmitted to the vehicle nor to the spring suspension system thereof.

That the present invention has a unique energy absorbing characteristic is evident from the "unloading curve" of Fig. 3. Whereas a spring, a pneumatic tire, or a solid tire has practically no "hysteresis" effect (i. e. the loading and unloading curves are identical) the present invention is characterized by entirely separate and distinct compression (loading) and unloading displacements. In Fig. 3 the area between the compression (loading) curve and the unloading curve for the present invention represents the actual energy absorbed.

While I have shown the preferred form of my invention, it is to be understood that various changes may be made in its construction by those skilled in the art without departing from the spirit of the invention as defined in the appended claims.

Having thus described my invention, what I claim and desire to secure by Letters Patent is:

1. In a tire construction, an inner annular rim, an elastomer outer rim disposed in spaced relation to said inner rim, said outer rim being capable of local deformation and being resilient to resume its normal shape after the force causing said local deformation is removed, a plurality of radial elastomer columns, each having a length at least three times its minimum width and each fixed at its ends to the inner and outer rims respectively, each of said columns being substantially independently capable of buckling when a load above a predetermined amount is placed axially thereon by localized deformation of the outer rim, each of said columns being concave on one side and straight on the other side, the concave side of each column facing the straight side of the next adjacent column, whereby the direction of buckling of the columns is predetermined so that like portions of the tire will have like load sustaining characteristics during and after buckling of the columns.

2. In a tire construction, a substantially rigid hub, an elastomer inner rim carried by said hub, an elastomer outer rim disposed in spaced relation to said inner rim, said outer rim being capable of local deformation and being resilient to resume its normal shape after the force causing said local deformation is removed, a plurality of radial elastomer columns each fixed at its ends to the inner and outer rims respectively, each of said columns having a length at least three times its minimum width and being substantially independently capable of buckling when a load above a predetermined amount is placed axially thereon by localized deformation of the outer rim, each of said columns being concave on one side and straight on the other side, the concave side of each column facing the straight side of the next adjacent column, whereby the direction of buckling of the columns is predetermined so that like portions of the tire will have like load sustaining characteristics during and after buckling of the columns.

References Cited in the file of this patent

UNITED STATES PATENTS

| | | |
|---|---|---|
| 1,258,573 | Johnstone | Mar. 5, 1918 |
| 1,292,345 | Martin | Jan. 21, 1919 |
| 1,365,539 | Pepple | Jan. 11, 1921 |
| 1,617,870 | Snider | Feb. 15, 1927 |
| 1,678,631 | Barker | July 31, 1928 |

FOREIGN PATENTS

| | | |
|---|---|---|
| 241,090 | Great Britain | Oct. 15, 1925 |
| 921,578 | France | Jan. 13, 1947 |